United States Patent [19]

Cuisia

[11] Patent Number: 4,556,493
[45] Date of Patent: Dec. 3, 1985

[54] COMPOSITION AND METHOD FOR INHIBITING SCALE

[75] Inventor: Dionisio G. Cuisia, Chicago, Ill.

[73] Assignee: Dearborn Chemical Company, Lake Zurich, Ill.

[21] Appl. No.: 709,822

[22] Filed: Mar. 7, 1985

Related U.S. Application Data

[63] Continuation of Ser. No. 467,141, Feb. 16, 1983, abandoned.

[51] Int. Cl.$^4$ .............................. C02F 5/12; C02F 5/14
[52] U.S. Cl. ................................... 210/699; 210/698; 252/180
[58] Field of Search .............................. 210/698–701; 252/180, 181, 82; 422/15–17

[56] References Cited

U.S. PATENT DOCUMENTS

| | | | |
|---|---|---|---|
| 2,723,956 | 11/1955 | Johnson | 210/698 |
| 3,549,538 | 12/1970 | Jacklin | 252/82 |
| 3,630,937 | 12/1971 | Baum | 252/181 |
| 3,666,664 | 5/1972 | Lorenc et al. | 210/700 |
| 3,804,770 | 4/1974 | Lorenc et al. | 252/180 |
| 3,806,459 | 4/1974 | Petrey | 252/180 |
| 3,959,167 | 5/1976 | Hwa et al. | 252/180 |
| 4,118,318 | 10/1978 | Welder et al. | 210/700 |
| 4,255,259 | 3/1981 | Hwa et al. | 210/699 |
| 4,306,991 | 12/1981 | Hwa et al. | 252/180 |
| 4,351,796 | 9/1982 | Marshall | 252/181 |

FOREIGN PATENT DOCUMENTS

| | | |
|---|---|---|
| 1216781 | 12/1970 | United Kingdom . |
| 1414918 | 11/1975 | United Kingdom . |
| 2023121 | 12/1979 | United Kingdom . |
| 2061249 | 5/1981 | United Kingdom . |

*Primary Examiner*—Peter Hruskoci
*Attorney, Agent, or Firm*—William W. McDowell, Jr.

[57] ABSTRACT

The accumulation of scale in an aqueous system is inhibited by the addition of a composition comprising a copolymer of maleic acid or anhydride and and styrene sulfonic acid, an organic phosphonate such as aminotri(methylene phosphonic acid) or hydroxyethylidene diphosphonic acid, and an aminocarboxylate chelating compound such as nitrilotriacetic acid or ethylenediamine tetraacetic acid, or their water soluble salts.

2 Claims, No Drawings

COMPOSITION AND METHOD FOR INHIBITING SCALE

This is a continuation of application Ser. No. 467,141 filed Feb. 16, 1983, now abandoned.

This invention relates to the treatment of aqueous systems and, more particularly, to the inhibition and removal of solid deposits in industrial heating and cooling systems.

The water used in industrial aqueous systems such as steam generating boilers, hot water heaters, heat exchangers, cooling towers, desalination systems, cleaning systems, pipe lines, gas scrubber systems, and associated equipment contains various impurities. The impurities typically include alkaline earth cations such as calcium, barium, and magnesium and several anions such as bicarbonate, carbonate, sulfate, oxalate, phosphate, silicate, and fluoride. These anions and cations combine and form precipitates due to the pH, pressure, or temperature in the system or the presence of additional ions with which they form insoluble products. The most common impurities in industrial water supplies are the water hardening ions such as the calcium, magnesium and carbonate ions. In addition to precipitating as carbonates, calcium and magnesium as well as any iron or copper present can also react with phosphate, sulfate, and silicate ions and form the respective complex insoluble salts. These solid reaction products accumulate on surfaces of the system and form scale. The water may also contain various solids such as mud, clay, iron oxides, silt, sand, and other mineral matter and microbiological debris that accumulate as sludge deposits in the system. Iron oxides may be present in the feedwater and may be produced by corrosion of metal surfaces in contact with the water. The sludge may become incorporated in the scale deposits and the precipitates tend to cement the sludge particles and form a strongly adherent scale.

Sludge and scale deposits greatly reduce heat transfer efficiency by settling at low flow points in the system and limiting the circulation of the water and insulating it from the heat surfaces. In addition to interfering with heat transfer and fluid flow, corrosion of metal surfaces underneath the deposits is facilitated since corrosion control agents are unable to contact the surfaces effectively. The deposits also harbor bacteria. Removal of the deposits can cause expensive delays and shutdown of the system. Water at the relatively high temperatures in steam generating boilers and hard waters are especially susceptible to scale formation. Extremely severe scale deposits can cause localized overheating and rupture in boilers.

Since external treatments of the feedwater to industrial systems such as softening, coagulation, and filtration do not adequately remove solids and solid-forming substances, various internal chemical treatments have been used to prevent and remove scale and sludge in aqueous systems. The chemical treatment generally involves the combined use of a precipitating agent and a solid conditioner to maintain the solids in the boiler water in a suspended state for effective removal. The precipitating chemicals commonly employed for calcium salts are soda ash and sodium phosphates. Magnesium is precipitated by the alkalinity of boiler water as magnesium hydroxide.

A variety of polycarboxylate and other water soluble, polar polymers such as acrylate polymers have been used as solids conditioners in industrial water systems. The presence of small quantities of these polymers improves the fluidity of the precipitated sludge and results in the formation of amorphous, frangible and serrated precipitates instead of hard, dense, crystals that form scale on surfaces. The finely dispersed solid particles remain suspended and are carried out of the system by the flow of water or by blowdown.

The precipitation of scale forming compounds can be prevented by inactivating their cations with chelating or sequestering agents so that the solubility of their reaction products is not exceeded. Various nitrogen containing compounds such as ethylenediamine tetraacetic acid and nitrilotriacetic acid have been used as chelants in water treatment.

Phosphonates are used extensively in water treatment as precipitation inhibitors and are effective in threshold amounts that are markedly lower than the stoichiometric amount required for chelating or sequestering the scale forming cation.

U.S. Pat. Nos. 3,666,664 and 3,804,770 of Lorenc et al. disclose scale inhibitors containing nitrilotriacetic acid or ethylenediamine tetraacetic acid and an organic amino methylene phosphonate. Preferably, the composition also includes a polymer such as a water soluble sulfoxy-free polar addition polymer. The preferred water soluble anionic polymers are the maleic anhydride and non-sulfonated styrene copolymers of U.S. Pat. No. 2,723,956 of Johnson and U.S. Pat No. 3,549,538 of Jacklin in which the copolymers are employed with a nitrilo compound, especially a nitrilo tricarboxylic acid salt, as a scale inhibitor.

U.S. Pat. No. 3,959,167 of Hwa et al. discloses a composition for inhibiting or preventing accumulation of scale or the like on heating surfaces in an aqueous system. The composition comprises an acrylic polymer, a water soluble chelant which may be nitrilotriacetic acid or ethylenediamine tetraacetic acid, and an organophosphonic acid which may be aminotri(methylenephosphonic acid) or a hydroxyalkylidene diphosphonic acid such as hydroxyethylidene diphosphonic acid.

U.S. Pat. Nos. 4,255,259 and 4,306,991 of Hwa and Cuisia disclose a composition for inhibiting scale in aqueous systems which comprises a copolymer of styrene sulfonic acid and maleic anhydride or maleic acid and a water soluble phosphonic acid or salts thereof. Various phosphonic acids including hydroxyethylidene disphosphonic acid, nitrilo tri(methylene phosphonic acid), and other amino methylene phosphonic acids may be used.

U.S. Pat. No. 3,630,937 of Baum et al. discloses a composition for boiler water treatment which contains a sulfonated polystyrene as a dispersant and sludge conditioner and an optional chelating agent such as nitrilotriacetic acid, ethylenediamine tetraacetic acid, or their sodium salts.

The composition for inhibiting formation of scale in an aqueous system of the present invention comprises (a) a copolymer of maleic acid or anhydride and styrene sulfonic acid or a water soluble salt thereof; (b) an organic phosphonate of the general formula:

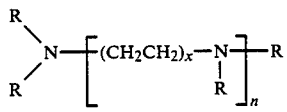

wherein R is

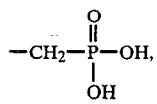

n is to 0 to 6, and X is 1 to 6, or of the general formula:

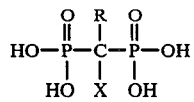

wherein X is —OH or —NH$_2$ and R is an alkyl group of from 1 to 5 carbon atoms, or a water soluble salt thereof; and (c) an aminocarboxylate chelating compound of the general formula:

wherein x is 1 to 2, R represents —(CH$_2$)$_x$—Z or —CH$_2$CH$_2$N[—(CH$_2$)$_x$—Z]$_2$ and each Z individually represents a —COOH group, or a water soluble salt thereof. The method of inhibiting the formation of scale in an aqueous system of the present invention comprises adding to the system a scale inhibiting amount of the composition.

The present invention provides unexpectedly superior inhibition of deposition and formation of scale, particularly those containing calcium and magnesium phosphates and silicates and iron oxide, on the metallic structures of industrial water systems. The composition and method are effective when used in water at high temperatures and pressures in steam generating boilers and the copolymer remains soluble in water of high hardness and alkalinity. The invention exhibits the threshold effect of the inhibition of formation of metallic salt crystals and the prevention of their adherence to heat transfer surfaces at low treatment levels.

The chelating compounds used in the present invention are water soluble aminocarboxylates. The preferred aminocarboxylate chelating compounds are ethylenediamine tetracetic acid and nitrilotriacetic acid. In other words, in these preferred compounds, x is 1 and all the three Z radicals are the same. Nitrilotriacetic acid is as especially preferred chelating compound.

The present invention employs water soluble amino alkylene phosphonic acids, hydroxy or amino alkylidene phosphonic acids, or water soluble salts thereof. The preferred compounds are aminotri(methylene phosphonic acid), hydroxyethylidene-1,1-diphosphonic acid and water soluble salts thereof. Hydroxyethylidene-1,1-diphosphonic acid is especially preferred. Other suitable phosphonic acids having these formulas include ethylenediamine tetra(methylene phosphonic acid), diethylenetriamine penta (methylene phosphonic acid), triethylenetetraamine hexa (methylene phosphonic acid), hexamethylenediamine tetra(methylene phosphonic acid), aminoethylidene diphosphonic acid, aminopropylidene diphosphonic acid, hydroxypropylidene diphosphonic acid, hydroxybutylidene diphosphonic acid, and hydroxyhexylidene diphosphonic acid.

The composition of the present invention further comprises a water soluble copolymer of maleic acid or anhydride and styrene sulfonic acid or water soluble salts thereof. The polymer may be prepared by copolymerizing maleic acid or anhydride with styrene sulfonic acid or an alkali metal salt thereof. Conventional addition polymermization methods in the presence of light or free radical initiators may be employed. Another method of producing the copolymers is to copolymerize the maleic and styrene monomers and sulfonate the copolymer in accordance with conventional methods such as with a sulfur trioxide-organic phosphorus compound as described in U.S. Pat. No. 3,072,618. The degree of sulfonation can vary but substantially complete sulfonation is preferred.

The relative proportions of styrene sulfonate and maleic anhydride depend upon the degree of scale inhibition needed. The copolymer generally contains from about 10 to about 90 mole percent of the sulfonate. Preferably, the mole ratio of styrene sulfonate moieties to maleic acid or anhydride derived moieties is from about 1:1 to about 4:1 and especially is from about 1:1 to about 3:1.

The average molecular weight of the copolymer is not critical so long as the polymer is water soluble. Generally, the molecular weight is preferably from about 1,000 to about 25,000 and especially is from about 6,000 to about 10,000.

The aminocarboxylates, phosphonates and copolymers are generally used in the form of an alkali metal salt and usually as the sodium salt. Other suitable water soluble salts include potassium, ammonium, zinc, and lower amine salts. The free acids may also be used and all of the acidic hydrogens need not be replaced nor need the cation be the same for those replaced. Thus, the cation may be any one of or a mixture of NH$_4$, H, Na, K, etc. The copolymer is converted into the water soluble salts by conventional methods.

While it is possible to add each of the components separately to an aqueous system, it is generally more convenient to add them together in the form of a composition. The composition of the present invention generally comprises from about 0.1 to about 100, preferably about 2 to about 6, parts by weight of the copolymer; from about 0.1 to about 100, preferably about 0.5 to about 5, parts by weight of the phosphonate, and from about 0.1 to about 100, preferably about 0.5 to about 5, parts by weight of the aminocarboxylate. The polymer and phosphonate are used in weight ratios generally of from about 10:1 to about 1:10, preferably of from about 4:1 to about 1:4, and especially of about 1:1. In general, the aminocarboxylate and the copolymer are used in the weight ratios of from about 50:1 to 1:10, preferably of from about 30:1 to about 10:1, and especially of about 18:1. The ratio of aminocarboxylate to phosphonate is generally from about 50:1 to about 5:1, preferably from about 20:1 to about 5:1, and especially of from about 10:1 to about 8:1.

The compositions may be added as dry powders and permitted to dissolve during use but normally are used in the form of aqueous solutions. The solutions generally contain from about 0.1 to about 70 weight percent of the composition and preferably contain from about 1 to about 40 weight percent. The solutions can be made by adding the ingredients to water in any order.

The amount of the composition added to the water is a substoichiometric amount that is effective to inhibit scale and sludge and depends on the nature of the aqueous system to be treated. The phosphonate and aminocarboxylate dosage depends to some extent on the amounts of hardness causing and scale forming compounds present in the system. The copolymer dosage depends to some extent on the concentration of suspended solids and existing levels of solids buildup in the system. The composition generally is added to the aqueous system in an amount of from about 0.01 to about 500 parts per million (ppm) and preferably of from about 0.1 to about 50 parts per million of system water.

The compositions of this invention may include or be added to water containing other ingredients customarily employed in water treatment such as alkalies, lignin derivatives, other polymers, tannins, other phosphonates, biocides, and corrosion inhibitors. The composition may be introduced at any location where it will be quickly and efficiently mixed with the water of the system. The treatment chemicals are customarily added to the makeup or feed water lines through which waters enters the system. Typically, an injector calibrated to deliver a predetermined amount periodically or continuously to the makeup water is employed.

The present invention is especially useful in the treatment of alkaline boiler water such as the feed or makeup water in a steam generating boiler. Such boiler systems are generally operated at a temperature of from about 298° to about 637° F. and a pressure of from about 50° to abot 2,000 psig.

The composition and method for its use of this invention are illustrated by the following examples in which all parts are by weight unless otherwise indicated.

EXAMPLES 1 and 2

Aqueous solutions of a composition containing one part of hydroxyethylidene diphosphonic acid, one part of nitrilotriacetic acid, and three or six parts of a copolymer of sodium styrene sulfonate and maleic anhydride were prepared. The treatment solutions also contain sodium phosphate, sodium sulfate, sodium sulfite, sodium hydroxide, and sodium chloride in amounts sufficient to provide the boiler water composition shown below in Table I. Solutions containing the same amounts of the treatment chemicals and the same parts of each component of the composition were also prepared.

The sludge conditioning and scale inhibiting properites of these solutions were evaluated in a small laboratory boiler which had three removable tubes as described in the Proceedings of the Fifteenth Annual Water Conference, Engineers Society of Western Pennsylvania, pp. 87-102 (1954). The feedwater for the laboratory boiler was prepared by diluting Lake Zurich, Ill. tap water with distilled water to 40 ppm total hardnesss as $CaCO_3$ and adding calcium chloride to provide a 6 to 1 elemental calcium to magnesium ratio. The feedwater and chemical treatment solutions were fed to the boiler in a ratio of 3 volumes of feedwater to 1 volume of solution giving a feedwater total hardness of 30 ppm of $CaCO_3$. The scaling tests for all the treatment solutions were conducted by adjusting boiler blowdown to 10 percent of the boiler feedwater giving approximately 10 concentrations of the boiler water salines and adjusting the composition of the treatment solution to give a boiler water after the 10 concentrations having the composition shown in Table I.

TABLE I

| | |
|---|---|
| Sodium Hydroxide as NaOH | 258 ppm |
| Sodium Carbonate as $Na_2CO_3$ | 120 ppm |
| Sodium Chloride as NaCl | 681 ppm |
| Sodium Sulfite as $Na_2SO_3$ | 50 ppm |
| Sodium Sulfate as $Na_2SO_4$ | 819 ppm |
| Silica as $SiO_2$ | less than 1 ppm |

TABLE I-continued

| | |
|---|---|
| Iron as Fe | less than 1 ppm |
| Phosphate as $PO_4$ | 10-20 ppm |

The scaling tests were run for 45 hours each at a boiler pressure of 400 psig. Upon the completion of a test, the boiler tubes were individually removed from the boiler and the scale of deposit present on 6 inches of the central length of each tube was removed by scraping, collected in a tared vial, and weighed. The results of the tests are shown in Table II.

TABLE II

| Run No. | Additive | Additive Dosage in the Feed (ppm) | Scale Reduction (%) |
|---|---|---|---|
| 1 | Styrene sulfonate and maleic anhydride copolymer (I) | 0.5 | 66.1 |
| 2 | Hydroxyethylidene diphosphonic acid (II) | 0.5 | 20.0 |
| 3 | Nitrilotriacetic acid (III) | 1.0 | 6.0 |
| 4 | I + II + III (3:1:1 active) | 0.5 | 95.5 |
| 5 | I + II + III (6:1:1 active) | 0.5 | 96.0 |

The comparative results on scale formation shown in Table II demonstrate that the composition and method of the present invention provide scale inhibition that is very considerably superior to that of the components added separately.

EXAMPLE 3

The same laboratory boiler was used to study the efficiency of the composition of this invention and each of its components as additives in preventing the formation of new scale or removal of existing scale in an already scaled boiler. The boiler was first operated to form scale on the tubes and the boiler water surfaces. The amount of calcium phosphate (hydroxyapatite) scale was established by conducting several runs.

After the prescaling, the boiler was shut down to remove one tube specimen and determine the initial amount of scale on the tubes. The operation was continued for another 45 hours using feedwater containing 30 ppm (as $CaCO_3$) total hardness and thhe treatment additive. Other boiler water chemicals such as those described in Examples 1 and 2 were also used. The boiler water pressure was 400 psig and the boiler water concentration was ten times.

The scale deposited on the testing tubes was 5.98 grams (average) during the first stage (prescaling) and an additional 8.99 grams during the second stage where no additive treatment (blank) was added. The results of the tests are shown in Table III.

TABLE III

| Run No. | Additive | Additive Dosage in the Feed (ppm) | Scale Formed (or Removed) in grams | Scale Reduction (%) |
|---|---|---|---|---|
| 1 | Blank (No Additive) | — | 8.99 | — |
| 2 | Styrene Sulfonic Acid and maleic anhydride (I) | 2 | (0.07) | 100.8 |

TABLE III-continued

| Run No. | Additive | Additive Dosage in the Feed (ppm) | Scale Formed (or Removed) in grams | Scale Reduction (%) |
|---|---|---|---|---|
| 3 | Hydroxyethylidene diphosphonic acid (II) | 3 | 1.52 | 83.1 |
| 4 | Nitrilotriacetic acid (III) | 3 | 3.64 | 59.5 |
| 5 | I + II + III (3:1:1 active) | 2 | (0.65) | 107.2 |

The results demonstrate the unexpectedly superior effectiveness of the composition and method of this invention in removing existing scale.

I claim:

1. A composition for inhibiting formation of scale in an aqueous system comprising an aqueous solution of a composition comprising
   (a) from about 2 to about 6 parts by weight of a copolymer of maleic acid or anhydride and styrene sulfonic acid or a water soluble salt thereof, said copolymer having a molecular weight of from about 1,000 to about 25,000 and a styrene sulfonic acid to maleic acid or anhydride mole ratio of from about 1:1 to about 4:1;
   (b) from about 0.5 to about 5 parts by weight of hydroxyethylidene-1,1-diphosphonic acid or a water soluble salt thereof; and
   (c) from about 0.5 to about 5 parts by weight of nitrilotriacetic acid or a water soluble salt thereof.

2. A method of inhibiting formation of scale in a steam generating boiler comprising adding to the boiler water an aqueous solution of a composition comprising
   (a) from about 2 to about 6 parts by weight of a copolymer of maleic acid or anhydride and styrene sulfonic acid or a water soluble salt thereof, said copolymer having a molecular weight of from about 1,000 to about 25,000 and a styrene sulfonic acid to maleic acid or anhydride mole ratio of from about 1:1 to about 4:1;
   (b) from about 0.5 to about 5 parts by weight of hydroxyethylidene-1,1-diphosphonic acid or a water soluble salt thereof; and
   (c) from about 0.5 to about 5 parts by weight of nitrilotriacetic acid or a water soluble salt thereof; said composition being added in an amount of from about 0.1 to about 50 parts per million of water in the boiler.

* * * * *